United States Patent [19]

Rosoff

[11] 3,880,155

[45] Apr. 29, 1975

[54] THERAPEUTIC APPLIANCES

[75] Inventor: Samuel Rosoff, Yonkers, N.Y.

[73] Assignee: General Electric Company, Waterford, N.Y.

[22] Filed: Aug. 24, 1973

[21] Appl. No.: 391,205

Related U.S. Application Data

[63] Continuation of Ser. No. 187,526, Oct. 7, 1971, abandoned, which is a continuation of Ser. No. 52,089, July 2, 1970, abandoned.

[52] U.S. Cl. ............ 128/90; 128/DIG. 21; 128/156; 260/46.5 G; 117/135.1
[51] Int. Cl. .............................................. A61f 5/04
[58] Field of Search ...... 128/90, DIG. 21, 156, 595; 260/46.5 G, 18, 32.8; 117/123, 135.1

[56] References Cited
UNITED STATES PATENTS

| | | | |
|---|---|---|---|
| 2,890,188 | 6/1959 | Konkle et al. | 260/46.5 G |
| 3,065,194 | 11/1962 | Nitzsche et al. | 260/46.5 G |
| 3,127,363 | 3/1964 | Nitzsche et al. | 128/90 X |
| 3,127,363 | 3/1964 | Nitzsche et al. | 260/46.5 G |
| 3,161,614 | 12/1964 | Brown et al. | 260/46.5 G |

OTHER PUBLICATIONS

"A Technique for Dynamically Molding Shield and Orthodigital Devices," T. Jones, Dow Corning Bulletin, Vol. 10, No. 3, 1968 pp. 11, 12, 1968.
"Prosthesis for Dural Defects," W. Wallace, Dow Corning Bulletin, Vol. 2, No. 1, p. 1, 1960.
"Silicone Foam Resting Splints for Rhematoid Arthritis," I. Shalit, The Lancet, Jan. 1965, pp. 142-144.
"Transparent RTV Silicone Rubber, Dow Corning Bulletin, Vol. 5, No. 2, p. 8, 1963.

*Primary Examiner*—Richard A. Gaudet
*Assistant Examiner*—J. Yasko
*Attorney, Agent, or Firm*—Donald J. Voss, Esq.; E. Philip Koltos, Esq.; Frank L. Neuhauser, Esq.

[57] ABSTRACT

A therapeutic or protective appliance formed to fit the surface of a segment of a body coated with a room temperature vulcanized silicone elastomer. The appliance may be made in rigid or flexible form, is reusable and durable, and may be maintained in a hygenic condition easily by washing or other means. Flexible appliances find application in body areas where soft tissue has been removed or disappeared such as disorders of the foot or toes or areas where flexibility is important to body comfort or function, and rigid appliances may be used as post-operative or other support or protective splints or appliances.

5 Claims, No Drawings

THERAPEUTIC APPLIANCES

This application is a continuation of application Ser. No. 187,526, filed Oct. 7, 1971, now abandoned, which in turn is a continuation of parent application Ser. No. 52,089, filed July 2, 1970 and now abandoned.

BACKGROUND OF THE INVENTION

The continuing search for improved therapeutic and protective appliances has ranged over a wide area and involves many types which have been fabricated from a host of materials. The literature is replete with descriptions of these types but all too frequently the appliances disintegrate quickly with usage or develop other undesirable characteristics. For example, cloth pads become matted and dirty; foam pads disintegrate rapidly with the friction, such as may be caused by the relative movement of the foot and the hard inner surface of a shoe; conventional latex pads do not have the desired softness or moisture permeability and are deleteriously affected by the oily secretions of the skin.

A busy practitioner must have conveniently usable materials which are obtained easily and readily utilized in a matter of moments as a treatment adjunct or, if necessary, as a treatment per se. The problem is even more complicated when a practitioner is required to prepare appliances for use within limited areas, such as a shoe, sleeve, pant leg or other which present severe space problems.

An appliance should be impervious and resistant to soap, alcohol, antiseptic washes or powders, ointments, creams and body oils. It should not darken with use, develop a foul odor or disintegrate in the presence of certain oils as does latex, for example, and it should not cause ill effects to skin or body areas with which it is in contact. An appliance should be tough and resistant to friction and pressures inherent in its use, and when necessary, modification or repair should be possible in a quick, simple and uncomplicated manner.

The inherent character of a therapeutic or protective appliance should remain unchanged during the process of fabrication and this, along with compatability with body areas, are perhaps the most important characteristics sought in the selection of starting materials. Frequently, a resilient foam or felt becomes rock-like in consistency after only limited use and attempts are made to protect these and other resilient materials with various known adhesives or coating materials, the adhesive or coating causes the material to become hard.

An appliance should mold dynamically to the area under treatment and must be malleable so that it conforms readily to multifaceted parts with no undue pressures where not indicated. An appliance should also be moisture permeable allowing moisture vapor to escape from the covered area and yet be waterproof so that it may be washed with soap and water without becoming impregnated or damaged with water. The device can be washed by removing the device from the body. After washing, the device can be reapplied. Where the body member is such that a one-piece device cannot easily be removed, the device can be made in two or more segments. The device can be held in place by adhesive tape or an adhesive placed between the body member and the device.

It is clear that a therapeutic or protective appliance which may be formed easily from readily available materials in a vigid or flexible foam and which will withstand continued use, pressures and cleaning without degradation is a worthwhile advance in the art.

SUMMARY OF THE INVENTION

In accordance with this invention there is provided a therapeutic or protective appliance comprising a material formed to fit a surface of a body coated with a room temperature vulcanizable silicone elastomer.

Room temperature vulcanizable silicone elastomers (RTV's) are known materials, are supplied in tubes, are available for use easily by the practitioner, and spread readily with the use of a spatula, tongue depressor or other similar device. RTV's will adhere to a wide variety of materials commonly used in everyday practice such as felt, moleskin, gauze, foam rubber, tubular foam, plaster of paris impregnated gauze, shims used for defective heel build-up, elastic fabric and combinations of these materials as well as others.

The RTV's which are commercially available do not permeate the material to which they are applied to any great extent, but rather form a skin which adheres without changing the inherent character of the selected material. This is of utmost importance since foam rubber and similar soft or elastic materials retain their original consistency within the coating, as does whatever is selected for coating; however, the coated material becomes virtually impervious to wear, is tough, rubbery, sanitary and retains its moisture permeable characteristics while being waterproof and washable. RTV coatings skin over in a few minutes, air dry in about an hour, and set firmly in 24 hours or less and are sufficiently heat stable to be autoclaved or heat sterilized. Coated materials remain flexible in high or low temperature usage, are unaffected generally by time and do not harden, crack or dry out. The coated appliance does not adhere to tissue, does not promote tissue reactions and are resistant to oxidation, sunlight, water and aging effects; further, appliances of this invention are not attacked by fats or oils, will not support bacterial growth, cure to resilient rubber at room temperature without shrinkage and are moisture permeable.

DESCRIPTION OF THE PREFERRED EMBODIMENTS

A therapeutic or protective appliance of this invention may be used as pads or splints on various parts of the body but are particularly adaptable to the foot and other body appendages. For example, various disorders of the big toe, such as hallux valgus, hallux rigidus, sesamoditis, neurofibroma (so called "pinch callous") or any combination of the above may be treated with the therapeutic or protective appliances of this invention. Similar disorders of the other toes may be treated in a like manner. The appliances are particularly useful where a foot is deficient in soft tissue. The therapeutic or protective appliance of the present invention are also very useful in the build-up of the heel of the foot, to ease pain caused by joint inflammation, or to make flexible or rigid detachable appliances for attachment to body areas.

The therapeutic or protective appliances of the present invention are also quite useful in covering thin plaster of paris casts to prevent surface abrasion and to assist in holding them in place and also to provide a rigid cast which is comfortable, removable, washable and replacable.

The RTV used in the following examples was prepared by mixing at room temperature 100 parts of a base compound, 3.2 parts of methyltriacetoxysilane, 0.8 parts of di-t-butoxydiacetoxysilane and 0.025 parts of dibutyl tin dilaurate. All parts are by weight unless otherwise specified. The base compound consisted of 100 parts of a 10.000 centipoises viscosity silanol-terminated polydimethylsiloxane of the formula

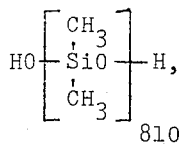

20 parts of octamethylcyclotetrasiloxane treated fumed silica having a surface area of approximately 200 square meters per gram, and 15 parts of a process aid prepared according to the teachings of U.S. Pat. No. 3,382,205. The process aid consisted of 5 mole per cent trimethylsiloxy units, 20 mole per cent monomethylsiloxy units, 75 mole per cent dimethylsiloxy units, and contained 5 weight per cent silanol. The process aid had a viscosity of 50 centipoises at 25°C and was devolatilized.

The RTV's used in the practice of the present invention have a viscosity of from 50,000 to 3 million centistokes and are silicone RTV's. The reason that silicone RTV's are used is due in part to the moisture permeable characteristics of the cured elastomeric material. It is not necessary that all monomeric units in the polysiloxane for the RTV be siloxy units. One or more organic units may be incorporated into the polysiloxane chain without destroying the moisture permeable characteristics of the cured material. Silicones as defined in the present specification include polysiloxanes containing one or more other organic units in the polysiloxane chain.

Examples of silicones containing other monomeric units is shown in U.S. Pat. No. 3,419,635 of Vaughn which issued in 1968 and patents describing conventional silicone RTV's useful in the practice of the present invention include U.S. Pat. Nos. 3,296,195 - Goossens, 1967; 3,296,161 - Kulpa, 1967; 2,843,555 - Berridge, 1958 and 3,294,739 - Weyenberg, 1966.

EXAMPLE 1 — REMOVABLE HALLUX JACKET

A hallux jacket was formed by first coating the entire area of the hallux with a thin layer of cortisone ointment to minimize the possibility of any sensitivity reaction to the occlusive dressing during the first hours the silicone was curing.

Following this, two pieces of tubular gauze, approximately 7 inches long, were cut and then slit lengthwise leaving 2 inches uncut. The uncut portion of one of the pieces was slipped over the great toe and the remainder of the piece was draped over the hallux area to check out the measurements and the gauze was trimmed as required. The layer of gauze was removed then from the great toe. The tubular gauze was then reapplied to the toe and it was smoothed out over the entire hallux area and a layer of RTV was then spatulated over the tubular gauze and a foamed pressure relief pad of choice was placed in position. The pressure relief pad consisted of a one-fourth inch thick pad made from foamed polyurethane. The outer surface of the pressure relief pad was then coated with RTV.

The second strip of tubular gauze was then carefully applied over the entire assembly with care not to disturb the positioning of the pressure relief pad and another layer of RTV was applied to the outer side of the last layer of tubular gauze. The distal end of the appliance was closed at the same time. A plastic bag of the type commonly used to wrap sandwiches was then used to cover the entire area and the plastic wrap was powdered. The patient then put on his shoes and stockings and was instructed to leave the wrapping intact overnight using a sock to sleep in as further, through perhaps unnecessary, protection. The patient was instructed not to leave the plastic wrap on his foot more than 24 hours to avoid maceration of the tissue.

Approximately 24 hours later, the preliminary appliance was carefully removed from the foot, trimmed with a scissors to make ti cosmetically acceptable and functionally correct, the distal toe area was slit to permit pressure relief in the distal area of the nail, and finally the area of the appliance covering the toe web was trimmed back to avoid cutting into the web space when the appliance was worn. With the appliance removed, the hallux area was then coated lightly with hydrocortisone ointment, RTV was spatulated onto the hallux area and the appliance was slipped on again. Another coat of RTV was applied to the outer side of the jacket, the wrap was applied and the patient received the same instructions as previously. The next day, after removal of the wrapping, the patient had a permanent, removable, washable, sanitary hallux jacket which was dynamically fitted, comfortable, and virtually indestructible.

On subsequent visits of the patient, additional build-ups were provided in desired areas and other areas of the appliance were ground and cut away easily to achieve optimum comfort and therapeutic effect for the patient. After prolonged use, any worn spots in the appliance were corrected with a layer of RTV in a matter of moments.

EXAMPLE 2 — REMOVABLE JACKET FOR THE LESSER TOES

A patient having inflamed joints in the lesser toes was treated by means of a pressure relief pad. The entire area of the lesser toes was covered with cortisone ointment. Two pieces of tubular gauze approximately 5 inches long were cut. The two pieces were then slit lengthwise leaving two inches uncut. The uncut portion was positioned over the toes and the remainder was draped over the remainder of the foot to check out the measurements and the gauze was cut to conform to the area to be covered. Both pieces of gauze were then laid aside and the entire area of the foot to be covered was covered with a thin layer of RTV, using a spatula as an applicator. One piece of gauze was then applied to the coated area, a layer of RTV was then spatulated over the gauze, and a pressure relief pad of choice was placed in position. To the outer surface of the pressure relief pad was applied more RTV. The second tubular gauze strip was then applied over the first strip being careful not to disturb the positioning of the pressure relief pad. Another layer of RTV was then applied to the outer side of the tubular gauze and the distal end of the appliance was closed at the same time. A sandwich bag was then applied over the entire area and the patient instructed and the appliance was finished as was done in Example 1.

One of the relatively newer shielding devices available to the foot specialists is tubular foam available in varying sizes, both with and without an elastic cloth lining. While most desirable as a soft tissue supplement for the toes, these sleeves heretofore had a serious disadvantage. They disintegrated within a matter of days even with careful handling. The most valuable feature of the foam, that of being exceptionally soft and fine, is retained when the foam is coated with RTV and the appliance formed by the coating of the foam is rendered servicable over a period of many months.

EXAMPLE 3 — TUBULAR FOAM HALLUX JACKET

A hallux jacket used as a soft tissue supplement on a toe having an inflamed joint was formed as follows: A 3-inch cut was made lengthwise of a tubular foam sleeve piece of approximately the same diameter as the great toe. The 3-inch cut was made on the thin side of the tubular foam sleeve. At the end of the lengthwise cut a second cut is made perpendicular to the lengthwise cut forming a T (most foam sleeves have a single and double thickness - the thin side refers to the side having the single thickness). What was formed by the cutting was an uncut ring which slips over the toe and by opening the cuts a wide protective shield which comfortably encompasses the bunion joint. The corners of the cuts were rounded to prevent rolling and to improve the appearance of the appliance. Because of the inherent softness of the material, no aperture is necessary. Permanization of the tubular foam sleeve is effected as in Example 1, i.e., by first applying a coating of cortisone ointment to the toe, then applying a coating of RTV, then covering the area with the tubular foam sleeve, then applying another layer of RTV over the tubular foam sleeve, then covering the formed appliance with a plastic bag allowing it to cure and then finishing the operation as outlined in Example 1.

EXAMPLE 4 — PLANTAR SOFT TISSUE SUPPLEMENT

A shield was prepared as in Example 3, except that a 5-inch long tubular foam sleeve was used. The sleeve was cut forming the T as described above. This sleeve was slipped over the three center toes with the "tail" extending over the plantar surface of the forefoot. The tail and the tubular area were then trimmed to the proper configuration. The foam pad is then permanized with RTV as described in the previous examples, i.e., by first coating the foot with cortisone ointment, then RTV, then coating the foamed pad with RTV and allowing it to cure while covered.

EXAMPLE 5 — TUBULAR FOAM SLEEVE FOR THE LESSER TOES

For the second, third and fourth toes rather than a T cut a U cut is indicated since lateral projections from the pad are unnecessary. A tubular foam sleeve was prepared for the number two toe having an inflammed joint as follows: A sleeve approixmately 3 inches long was used to prepare the following appliance. A U shaped cut, two inches long, was made in the sleeve. Approximately half of the sleeve was removed at the base in making the cut. The sleeve was permanized as set forth above, i.e., by first coating the toe with hydrocortisone ointment, then with RTV, applying the sleeve, coating the sleeve with RTV and allowing the RTV to cure.

EXAMPLE 6 — TUBULAR FOAM SLEEVE FOR THE FIFTH TOE

A patient having a plantar excrescence under the head of the fifth toe was treated as follows: A small tubular sleeve approximately 3 inches long was used. A T cut was made in the sleeve as was described in Examples 3 and 4. The pad was applied to the toe and trimmed and then permanized as set forth above. This is accomplished by first coating the toe with cortisone ointment, then RTV, coating the sleeve with RTV and allowing the RTV to cure.

EXAMPLE 7 — REAR FOOT APPLIANCE

The following device was constructed and applied for rear foot stabilization. A specialist splint, 6 inches in length and 2 inches in width, was applied to the foot and trimmed to shape, then removed. A part of the foot, i.e., the heel and center of the foot which comes into contact with the specialist splint was coated with RTV and the splint applied. A second layer of RTV was then applied over the outer surface of this splint and a second specialist splint was applied overlapping the previous strip by one-half of an inch. This technique of applying specialist splint was continued until the entire heel was encompassed. The RTV is then allowed to cure overnight and the appliance is then removed from the foot. The RTV is allowed to cure to the state that the appliance was removable from the heel without permanent deformation and then the device was removed and allowed to cure completely. This took about 24 hours. The heel of the device was then built up with RTV to the extent necessary and allowed to cure.

EXAMPLE 8 — POST OPERATIVE SPLINT

A post operative splint for a second toe is prepared as follows: A gauze and plaster of paris splint is prepared for the toe in a conventional manner. This involves applying a thin layer of gauze and wet unset plaster of paris to the toe. The plaster of paris impregnated gauze is then allowed to harden and set. The outer surface of the hardened set splint is then coated with a thin layer of RTV. The RTV layer protects the thin gauze plaster of paris splint from abrasion damage. The RTV coated splint is then covered with a plastic bag and allowed to cure overnight as in the previous examples.

What I claim is:

1. A therapeutic integral bandage composite suitable for application adjacent to the skin of the human limbs for imparting protection thereto comprising,
   a. a bandage material formed to fit the surface of a segment of the skin of a human, and
   b. coated with a one-part room temperature vulcanizable silicone rubber composition which vulcanizes at room temperature in the presence of atmospheric moisture to form a silicone rubber composition which comprises a silanol-terminated polydimethylsiloxane in the range of 10,000 centipoise viscosity at 25°C, fumed silica, a process aid, methyltriacetoxysilane, di-t-butoxydiacetoxysilane and dibutyl tin dilaurate.

2. The composite of claim 1 further characterized by the material being gauze.

3. The composite of claim 1 further characterized by the material being a foam.

4. The composite of claim 1 further characterized by the polysiloxane being a silicone copolymer.

5. The composite of claim 1 further characterized by the material being a hardened splint.

* * * * *